3,048,597
THIAZOLYLTHIOCYCLOHEXANONE OXIMES
John J. D'Amico, Charleston, W. Va., assignor to Monsanto Chemical Company, St. Louis, Mo., a corporation of Delaware
No Drawing. Filed Oct. 19, 1960, Ser. No. 63,480
8 Claims. (Cl. 260—302)

This invention relates to thiazolylthiocyclohexanone oximes. These compounds may be represented by the general formula

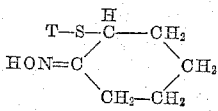

where T is a thiazolyl radical. Suitable thiazolyl radicals are 4-ethylthiazolyl, 4-methylthiazolyl, 4,5-dimethylthiazolyl, 4,5-diethylthiazolyl, 4-methyl-5-carbomethoxythiazolyl, 4-methyl-5-carboethoxythiazolyl, 4-carboethoxythiazolyl, 4-methyl-5-carbamylthiazolyl, 4-methyl-5-phenylcarbamylthiazolyl, benzothiazolyl, 4-ethylbenzothiazolyl, 7-methylbenzothiazolyl, 4-methylbenzothiazolyl, 5-methylbenzothiazolyl, 6-methylbenzothiazolyl, 4-chlorobenzothiazolyl, 4-methyl-6-chlorobenzothiazolyl, 6-chlorobenzothiazolyl, 6-phenylbenzothiazolyl, 4-phenylbenzothiazolyl, 4,5-dimethylbenzothiazolyl, 4,6-dimethylbenzothiazolyl, 4-methoxybenzothiazolyl, 5-methoxybenzothiazolyl, 6-methoxybenzothiazolyl, 4-methoxy-6-chlorobenzothiazolyl, 4-ethoxybenzothiazolyl, 5-ethoxybenzothiazolyl, 4,6-dimethyl-7-chlorobenzothiazolyl and 4,6-dimethyl-5,7-dichlorobenzothiazolyl.

Thiazolylthiocyclohexanone oximes result from treating the corresponding thiazolylthiocyclohexanone with hydroxylamine. The thiazolylthiocyclohexanones are described and claimed in my co-pending application Serial No. 63,254, filed October 18, 1960.

The following examples illustrate the invention but are not to be construed as limiting.

EXAMPLE 1

A suspension of 64 grams (0.244 mole) of 2-(2-benzothiazolylthio)cyclohexanone in 400 ml. of ethyl alcohol was stirred and heated to 50° C. to effect solution. While continuing the stirring there was added to the solution at 25° C. in one portion 21.2 grams (0.304 mole) of hydroxylamine hydrochloride in 50 ml. of water. This stirred mixture was then neutralized by adding dropwise over a period of 15 minutes 16.2 grams (0.152 mole) of sodium carbonate dissolved in 60 ml. of water. The temperature rose from 25° to 32° C. during the addition. The stirred reaction mixture was heated at refluxing temperature for 2 hours and then cooled to 5° C. 2-(2-benzothiazolylthio)cyclohexanone oxime was obtained in 73.3% yield as a tan solid. After recrystallization from ethyl alcohol it melted at 146–148° C. Analysis gave 9.6% nitrogen and 23.0% sulfur compared to 10.1% nitrogen and 23.0% sulfur calculated for $C_{13}H_{14}N_2OS_2$.

EXAMPLE 2

To a solution containing 59.6 grams (0.2 mole) of 2-(5-chloro-2-benzothiazolylthio)cyclohexanone in 400 ml. of ethyl alcohol was added in one portion with stirring at 25° C. 16.4 grams (0.25 mole) of hydroxylamine hydrochloride dissolved in 50 ml. of water. Then there was added over a period of 15 minutes at 25–32° C. 13.3 grams (0.125 mole) of sodium carbonate dissolved in 60 ml. of water. The stirred reaction mixture was heated at 78–80° C. for 2 hours and then cooled to 5° C. The precipitate was collected by filtration, washed with water until neutral to litmus and air-dried at 25–30° C. 2-(5-chloro-2-benzothiazolylthio)cyclohexanone oxime was obtained in 76.9% yield as a tan solid. After recrystallization from ethyl alcohol it melted at 186–187° C. Analysis gave 8.8% nitrogen, 20.7% sulfur and 11.9% chlorine compared to 9.0% nitrogen, 20.5% sulfur and 11.3% chlorine calculated for $C_{13}H_{13}ClN_2OS_2$.

EXAMPLE 3

In the procedure of Example 2, a slurry of 27 grams (0.1 mole) of 2-(5-carbamyl-4-methylthiazolylthio)cyclohexanone in 200 ml. of ethyl alcohol was added 8.2 grams (0.125 mole) of hydroxylamine hydrochloride in 25 ml. of water followed by the dropwise addition of 6.7 grams (0.063 mole) of sodium carbonate in 30 ml. of water. 2-(5-carbamyl-4-methylthiazolylthio)cyclohexanone oxime was obtained in 49.2% yield as a white solid. After recrystallization from alcohol it melted at 188–190° C. Analysis gave 14.7% nitrogen and 22.6% sulfur compared to 14.7% nitrogen and 22.5% sulfur calculated for $C_{11}H_{15}N_3O_2S_2$.

EXAMPLE 4

Substituting 2-(4-methyl-5-phenylcarbamylthiazolylthio)cyclohexanone for the thiazolylthiocyclohexanone in Example 2, an oily material was obtained containing a small amount of solids. These solids were removed by filtration and upon allowing the filtrate to stand over night, the oily material solidified. The solidified product was removed by filtration and air-dried at 25–30° C. 2-(4-methyl-5-phenylcarbamylthiazolylthio)cyclohexanone oxime was obtained in 74.5% yield as a tan solid melting at 140–142° C. after recrystallization from ethyl alcohol. Analysis gave 11.9% nitrogen and 17.9% sulfur compared to 11.6% nitrogen and 17.7% sulfur calculated for $C_{17}H_{19}N_3O_2S_2$.

EXAMPLE 5

To a solution containing 61.5 grams (0.2 mole) of 2-(6-ethoxy-2-benzothiazolylthio)cyclohexanone in 400 ml. of ethyl alcohol was added in one portion with stirring at 25° C. 16.4 grams (0.25 mole) of hydroxylamine hydrochloride dissolved in 50 ml. of water. Then there was added over a period of 15 minutes at 25–32° C. 13.3 grams (0.125 mole) of sodium carbonate dissolved in 60 ml. of water. The stirred reaction mixture was heated at 78–80° C. for 2 hours and then cooled to 5° C. The solvent was removed in vacuo and the residue extracted with 400 ml. of ethyl ether. The ether extract was washed with water until neutral to litmus and dried over sodium sulfate. Upon removal of ether in vacuo (30° C.) the resulting solid was air-dried at 25–30° C. 2-(6-ethoxy-2-benzothiazolylthio)cyclohexanone oxime was obtained in 80.5% yield as a tan solid. After recrysallization from ethyl alcohol it melted at 139–141° C. Analysis gave 8.5% nitrogen and 19.6% sulfur compared to 8.7% nitrogen and 19.9% sulfur calculated for $C_{15}H_{18}N_2O_2S_2$.

EXAMPLE 6

To a solution containing 34.2 grams (0.15 mole) of 2-(4-methyl-2-thiazolylthio)cyclohexanone in 200 ml. of ethyl alcohol was added in one portion at 25° C. 12.3 grams (0.188 mole) of hydroxylamine hydrochloride dissolved in 38 ml. of water. There was then added dropwise in 15 minutes at 25–30° C. 10 grams (0.094 mole) of sodium carbonate dissolved in 45 ml. of water. The stirred reaction mixture was heated at refluxing temperature for 2 hours and then cooled to 25° C. 200 ml. of water and 400 ml. of ethyl ether were then added and the solution stirred for 15 minutes. The ether solution was washed with water until neutral to litmus and dried over sodium sulfate. The ether was removed in vacuo at a maximum temperature of 80–90° C./1–2 mm. 2-(4-methyl-2-thiazolylthio)cyclohexanone oxime was obtained in 93.5% yield as a viscous oil.

EXAMPLE 7

Substituting 2-(5-carboethoxy - 4 - methyl-2-thiazolylthio)cyclohexanone for the thiazolylthiocyclohexanone employed in Example 6, 2-(5-carboethoxy-4-methyl-2-thiazolylthio)cyclohexanone oxime was obtained in 92.5% yield as a viscous amber oil. Analysis gave 8.1% nitrogen and 20.5% sulfur compared to 8.9% nitrogen and 20.4% sulfur calculated for $C_{13}H_{18}N_2O_3S_2$.

Thiazolylthiocyclohexanone oximes are valuable intermediates. Reduction with sodium and alcohol or with sodium amalgam and dilute acetic acid yields primary amines. They are also useful per se for accelerating vulcanization of rubber.

As exemplary of accelerating activity rubber stocks were compounded comprising

| Stock | A | B | C | D | E | F | G |
|---|---|---|---|---|---|---|---|
| | Parts by weight | | | | | | |
| Smoked sheets rubber | 100 | 100 | 100 | 100 | 100 | 100 | 100 |
| Carbon black | 50 | 50 | 50 | 50 | 50 | 50 | 50 |
| Zinc oxide | 5 | 5 | 5 | 5 | 5 | 5 | 5 |
| Stearic acid | 3 | 3 | 3 | 3 | 3 | 3 | 3 |
| Saturated hydrocarbon softener | 3 | 3 | 3 | 3 | 3 | 3 | 3 |
| Sulfur | 2.5 | 2.5 | 2.5 | 2.5 | 2.5 | 2.5 | 2.5 |
| Antioxidant | 1 | 1 | 1 | 1 | 1 | 1 | 1 |
| 2-(2-Benzothiazolylthio)-cyclohexanone oxime | 0.5 | | | | | | |
| 2-(5-Chloro-2-benzothiazolylthio)-cyclohexanone oxime | | 0.5 | | | | | |
| 2-(6-Ethoxy-2-benzothiazolylthio)-cyclohexanone oxime | | | 0.5 | | | | |
| 2-(4-Methyl-2-thiazolylthio)cyclohexanone oxime | | | | 0.5 | | | |
| 2-(5-Carbamyl-4-methyl-thiazolylthio)-cyclohexanone oxime | | | | | 0.5 | | |
| 2-(4-Methyl-5-phenylcarbamylthiazolylthio)-cyclohexanone oxime | | | | | | 0.5 | |
| 2-(5-Carboethoxy-4-methyl-2-thiazolylthio)-cyclohexanone oxime | | | | | | | 0.5 |

The stocks so compounded were cured in the usual manner by heating in a press for 45 minutes at 144° C. The physical properties of the vulcanizates are set forth below:

*Table I*

| Stock | Modulus of Elasticity in lbs./in.² at Elongation of 300% | Tensile at Break in lbs./in.² |
|---|---|---|
| A | 1,700 | 3,550 |
| B | 1,920 | 3,740 |
| C | 1,720 | 3,700 |
| D | 2,140 | 4,260 |
| E | 1,560 | 2,800 |
| F | 1,540 | 2,920 |
| G | 1,770 | 3,700 |

Another characteristic test was carried out in which 2-(2-benzothiazolylthio)cyclohexanone oxime was incorporated in a typical tread stock containing a retarder of vulcanization. As the formulation there was employed a mix comprising 100 parts of smoked sheet rubber, 50 parts of carbon black, 5 parts of zinc oxide, 3 parts of stearic acid, 3 parts of saturated hydrocarbon softener, 2.5 parts of sulfur, 1.5 parts of N-nitroso diphenylamine retarder and 0.5 part of 2-(2-benzothiazolylthio)cyclohexanone oxime. After curing the stock in the usual manner by heating in a press for 45 minutes at 144° C., the modulus of elasticity at 300% elongation was 1920 and the tensile at break was 3850 lbs./in.².

Although the invention has been illustrated by specific embodiments, it is not limited thereto. For example, the thiazolylthiocyclohexanone oximes may be used for the acceleration of other types of sulfur-vulcanizable rubbers. These rubbers comprise natural rubber in its various forms, as for example latex, crepe, smoked sheets, gutta-percha, balata and cyclo rubbers. The new compounds are applicable generally for acceleration of natural and synthetic elastomers, as for example polybutadiene, polyisoprene and polyisobutylene polymerized with a small proportion of a diolefin.

It is intended to cover all changes and modifications of the examples of the invention herein chosen for purposes of disclosure which do not constitute departure from the spirit and scope of the invention.

What is claimed is:

1. A 2-(2-thiazolythio)cyclohexanone oxime of the formula

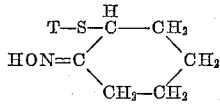

where T is a member of the group consisting of 4-(lower alkyl)-2-thiazolyl, 4(lower alkyl)-5-(lower carboalkoxy)-2-thiazolyl, 4,5-di-(lower alkyl) - 2 - thiazolyl, 4-(lower carboalkoxy) - 2 - thiazolyl, 4-(lower alkyl)-5-carbamyl-2-thiazolyl, 4-(lower alkyl) - 5 - (phenylcarbamyl)-2-thiazolyl, 2-benzothiazolyl, monochloro - 2 - benzothiazolyl, mono- and di-(lower alkyl) - 2 - benzothiazolyl, mono-(lower alkyl)monochloro - 2 - benzothiazolyl, phenyl - 2 - benzothiazolyl, di-(lower alkyl)monochlorobenzothiazolyl and di-(lower alkyl)dichloro-2-benzothiazolyl.

2. 2-(2-benzothiazolylthio)cyclohexanone oxime.

3. 2-(5-chloro - 2 - benzothiazolylthio)cyclohexanone oxime.

4. 2-(5-carbamyl - 4 - methyl-2-thiazolylthio)cyclohexanone oxime.

5. 2-(4-methyl - 5 - phenylcarbamyl-2-thiazolylthio)-cyclohexanone oxime.

6. 2-(6-ethoxy - 2 - benzothiazolylthio)cyclohexanone oxime.

7. 2-(4-methyl-2-thiazolylthio)cyclohexanone oxime.

8. 2-(5-carboethoxy - 4 - methyl-2-thiazolylthio)cyclohexanone oxime.

No references cited.